Figure 1:
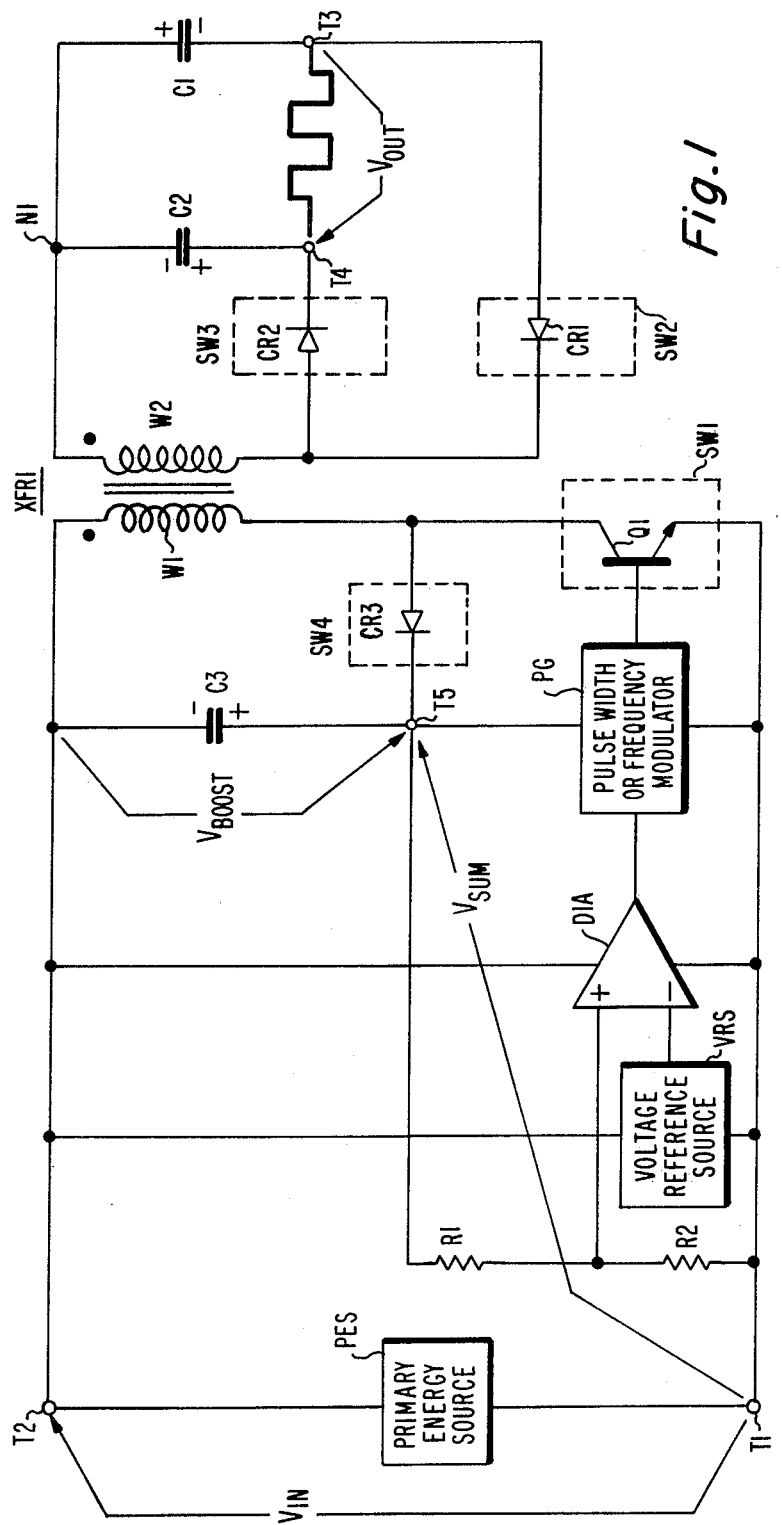

United States Patent [19]

Easter

[11] 4,425,611

[45] Jan. 10, 1984

[54] SWITCHING VOLTAGE REGULATORS WITH OUTPUT VOLTAGES INDIRECTLY REGULATED RESPECTIVE TO DIRECTLY REGULATED BOOSTED INPUT VOLTAGES

[75] Inventor: Finis C. Easter, Mount Laurel, N.J.

[73] Assignee: RCA Corporation, New York, N.Y.

[21] Appl. No.: 337,505

[22] Filed: Jan. 6, 1982

[30] Foreign Application Priority Data

Oct. 16, 1981 [GB] United Kingdom ............... 8131327

[51] Int. Cl.³ ........................................... H02P 13/18
[52] U.S. Cl. ...................................... 363/21; 323/299; 363/61
[58] Field of Search ........................... 363/20, 21, 61; 323/299, 286, 287

[56] References Cited

U.S. PATENT DOCUMENTS

| | | | |
|---|---|---|---|
| 3,275,922 | 9/1966 | Meyer et al. | 363/61 |
| 3,564,393 | 2/1971 | Williamson | 363/21 |
| 4,253,137 | 2/1981 | RAO | 363/21 |
| 4,374,355 | 2/1983 | Steigerwald | 363/21 |

OTHER PUBLICATIONS

Electronic Engineering, vol. 51, No. 625, p. 18, Jul. 1979.

Primary Examiner—William H. Beha, Jr.
Attorney, Agent, or Firm—Joseph S. Tripoli; George E. Haas; Allen LeRoy Limberg

[57] ABSTRACT

A switching voltage regulator in which the input voltage to a switching dc-to-dc converter is boosted and the output voltage of the converter is indirectly regulated responsive to direct regulation of the boosted voltage.

7 Claims, 6 Drawing Figures

SWITCHING VOLTAGE REGULATORS WITH OUTPUT VOLTAGES INDIRECTLY REGULATED RESPECTIVE TO DIRECTLY REGULATED BOOSTED INPUT VOLTAGES

The present invention relates to switching voltage regulators and, more particularly, to those in which the input voltage to a switching dc-to-dc converter is boosted and the output voltage of the converter is indirectly regulated responsive to direct regulation of the boosted voltage.

Rao in U.S. Pat. No. 4,253,137 issued Feb. 24, 1981 and entitled SWITCHED-MODE POWER SUPPLY describes a type of dc-to-dc converter in which the output voltage, which is to be regulated, is the sum of the voltages appearing across two output filter capacitors, one charged by its being transformer-coupled to the primary energy source through a plural-winding inductor, and the other charged by flyback action of the inductor. That is, the inductor is a transformer with an essentially non-saturing core that will operate as a flyback transformer. The output voltage or a portion thereof is compared to a voltage reference for developing an error signal. This error signal controls the switching of the switch means for selectively connecting the inductor primary winding to the primary energy source, completing the feedback loop for regulating the converter output voltage. The Rao arrangement has the problems usually encountered in switching regulators with closing a transformer-coupled feedback loop around non-linear elements in order to regulate output voltage.

These problems become especially difficult when the converted dc output voltage is to be dc-isolated from the dc input voltage, since dc isolation has to be provided in the feedback connection in addition to the dc isolation the transformers provide in the forward direction through the switching converter. Transformer-coupling or photo-coupling of switching pulses to the switch means for selectively connecting the inductor primary to the primary energy source entails the use of a further transformer or a photo-coupling device. These coupling elements tend to be expensive since, particularly where the switching regulator is operated in the ultrasonic frequency range, they should not introduce additional delay into the feedback loop, in order the loop be unconditionally stable against undesirable self-oscillatory tendencies. Isolation between input and output of a dc-to-dc converter used as switching regulator is desirable, for example, in a television set where power from the electric mains is rectified to provide the primary energy source for the converter. The inductor in such application can be the horizontal flyback transformer; and, since the power conversion is carried out in the ultrasonic frequency range, the core size is reduced.

The present invention is embodied in a switching-voltage regulator which like the Rao apparatus develops a regulated output voltage across the series connection of first and second capacitors, uses a first switch means for recurrently connecting the primary winding of a plural-winding inductor to a primary energy source, uses a second switch means to connect a secondary winding of the inductor to charge the first capacitor during times the first switch means is conductive, and uses a third switch means to connect that or another secondary winding of the inductor to charge the second capacitor during times the first switch means is non-conductive. The regulation of the output voltage across the first and second capacitor is not carried forward directly as in the regulators described by Rao, however, but rather indirectly, as follows. Fourth switch means connects a portion of the primary winding of the inductor (or an equivalent tertiary winding) across a third capacitor during times the first switch means is non-conductive so flyback current charges the third capacitor. The voltage developed across the capacitor is added to that of the primary energy source to develop a boosted input voltage, which is directly regulated in analogous manner to the regulation of output voltage in a regulator of the sort described by Rao. Then, by properly choosing the turns ratio in the inductor windings, the output voltage is indirectly regulated in proportion to the boosted input voltage.

Figure 6:
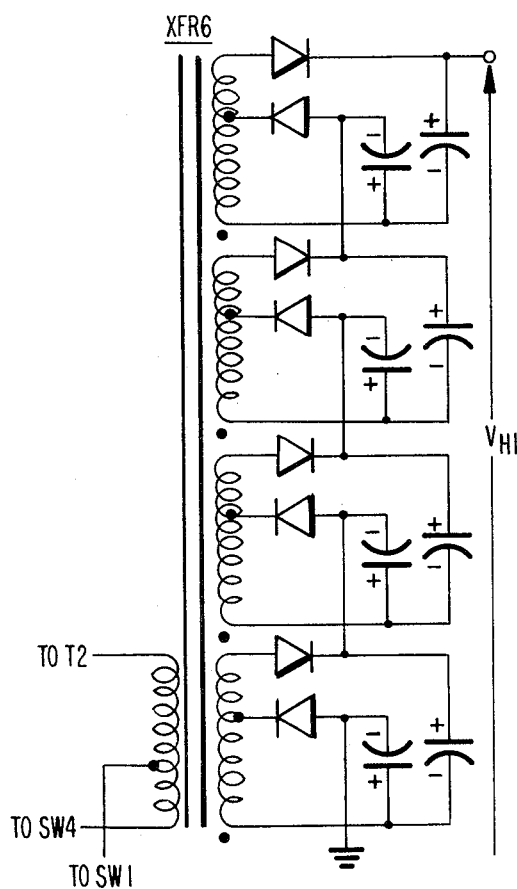
Figure 5:
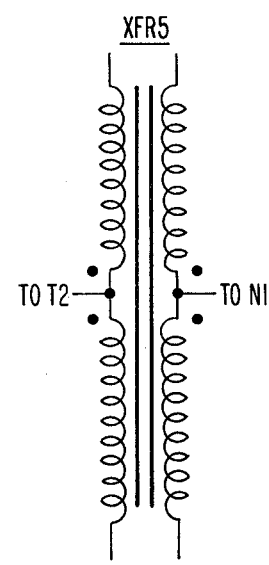

In the drawing:

FIG. 1 is a schematic diagram of a switching voltage regulator embodying the invention;

each of FIGS. 2, 3, 4, and 5 is a schematic diagram of an inductor that may replace that in FIG. 1 to form alternative embodiments of the invention; and FIG. 6 is a schematic diagram of a modification of FIG. 1 switching regulator for transforming up input voltages.

In FIG. 1 input terminals T1 and T2 are arranged to have a primary energy source PES connected between them to maintain an input voltage $V_{IN}$ between them. Converter load means LM connects between output terminals T3 and T4 to receive an output voltage $V_{OUT}$. Capacitors C1 and C2 have plates connected together at a node N1, and their other plates connect to T3 and T4, respectively.

Switch means SW1, shown as a common-emitter NPN transistor Q1, is recurrently rendered conductive to selectively apply $V_{IN}$ across the primary winding W1 of a plural-winding inductor, or flyback transformer, XFR1. The voltage induced across winding W2 as the electromagnetic field surrounding windings W1 and W2 builds up in strength is selectively applied across capacitor C1 by switch means SW2 being conductive. SW2 may, as shown, simply comprise a current rectifier CR1 poled to be forward-biased by the polarity of potential appearing across W2 during such build up. Neglecting the voltage drops across SW1 and SW2 when they are conductive, C1 is charged to cause the voltage between terminal T3 and node N1 at the interconnection of capacitors C1 and C2 to equal $V_{IN}(N_{W2}/N_{W1})$, where $N_{W2}$ and $N_{W1}$ are the numbers of turns in windings W2 and W1 respectively. This is the conventionally transformed component of $V_{OUT}$ and is in substantially non-changing proportion to $V_{IN}$ despite regulation of $V_{SUM}$.

At times when switch means SW1 is rendered non-conductive, the electromagnetic field previously built up around windings W1 and W2 proceeds to collapse and the polarity of the voltages induced across those windings reverses. Switch means SW3 is rendered conductive, and capacitor C2 is charged by the flyback current flow through winding W2 to develop between node N1 and terminal T4 the flyback component of $V_{OUT}$. This component of $V_{OUT}$ is that which is controlled by the ratio of the duration $\delta$ of switch means SW1 conduction to the duration $(1-\delta)$ of its non-conduction. Switch means SW3 conveniently comprises a current rectifier CR2 poled to be forward-biased by the flyback current from winding W2.

At the same time that switch means SW3 is conductive to charge C1, another switch means SW4 is conductive to charge another capacitor C3 with flyback current from winding W1. C3 connects between input terminal T2 and boost terminal T5, and a boost voltage $V_{BOOST}$ is developed thereacross. It is the sum, $V_{SUM}$, of $V_{IN}$ and $V_{BOOST}$ appearing between terminals T1 and T5 which is regulated by switch regulation of the component of that voltage appearing across C3. Since the conventionally transformed component of $V_{OUT}$ and $V_{IN}$ are in $N_{W2}:N_{W1}$ ratio, and the flyback voltages developed across W2 and W1 are in $N_{W2}:N_{W1}$ ratio, perforce $V_{OUT}$ and $V_{SUM}$ are in $N_{W2}:N_{W1}$ ratio. So direct regulation of $V_{SUM}$ provides for indirect regulation of $V_{OUT}$. Development of the error signal used in the regulation of $V_{SUM}$ and control of the switching of switch means SW1 (and of switch means SW2, SW3 and SW4 where their switching is controlled independently from that of SW1) is done as in the prior art.

E.g., $V_{SUM}$ is divided by a resistive potential divider shown comprising resistors R1 and R2; the divided voltage is compared to a reference voltage from a voltage reference source VRS using a differential-input amplifier DIA to develop the error signal; and the error signal is then used by a pulse generator PG to control the duration or frequency or both of pulses applied to the base-emitter junction of Q1 for conditioning it for conduction between collector and emitter. The values of $V_{SUM}$ and $V_{OUT}$ ideally have substantially the following values.

$$V_{SUM} = V_{IN} + (\delta/1-\delta)V_{IN} = V_{IN}/(1-\delta)$$

$$V_{OUT} = (N_{W2}/N_{W1})V_{IN}/(1-\delta)$$

The feedback circuit for regulating $V_{OUT}$ is entirely in the primary winding side of the converter transformer in the FIG. 1 switching voltage regulator, so there is no need for dc isolation in the feedback connection to pulse generator PG input. Direct coupling of pulse generator PG output to the control circuit of switch means SW1 (i.e., the base-emitter circuit of Q1) is also possible.

Figure 2:
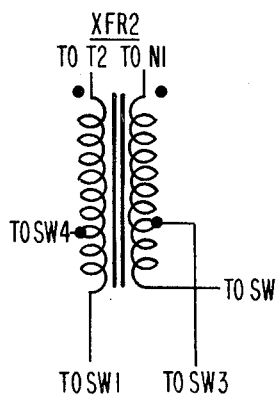
Figure 3:
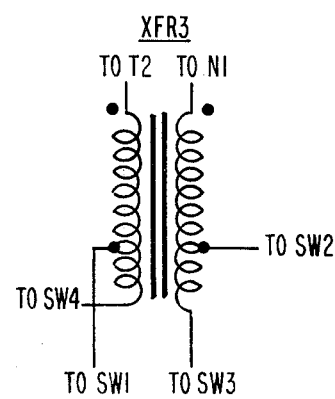
Figure 4:
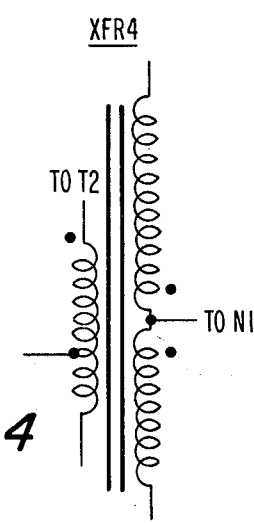

One can make arrangements so the proportion of the directly transformed component of $V_{OUT},(N_{W2}/N_{W1})V_{IN}$, to the flyback-transformed component of $V_{OUT}, (N_{W2}/N_{W1})(\delta/1-\delta)V_{IN}$, can be chosen differently, by using a plural-winding inductor with tapped primary and secondary autotransformer windings. FIGS. 2 and 3 show tapped plural-winding inductors XFR2 and XFR3 respectively for reducing and for increasing the proportion of $V_{SUM}$ contributed by $V_{BOOST}$. The use of tapped winding inductors provides additional design freedom. It will permit the adjustment of $\delta$ so that the transistor Q1 in switch means SW1 is operated within safe reverse voltage, peak current and maximum dissipation limits, while allowing adjustment to place more equal voltage stresses on capacitors C1 and C2 and on switch means SW2 and SW3 when they are reverse biased, for any $V_{OUT}$ to nominal $V_{IN}$ ratio. Step-up as between switch means SW1 and SW4 connections as shown in FIG. 3 can be used to take advantage of the generally higher peak reverse voltage rating of a current rectifier as used in SW4 as compared to that of a transistor as used in SW1 when stepping up substantially from $V_{IN}$ to $V_{OUT}$, to keep the ratio of secondary winding turns to primary winding turns smaller. Equivalent multiple-winding inductors, as exemplified by XFR4 and XFR5 of FIGS. 4 and 5, may replace any of inductors XFR1, XFR2 and XFR3 as well. Where separate windings are used for developing conventional transformation and flyback transformation components of an output or boost voltage, the order of the windings and the switch means in their series connections can be reversed. This can be advantageous where the switch means SW2, SW3, and SW4 are switched transistors rather current rectifiers, as may be done to reduce the potential drops across those switch means.

The invention lends itself to the upward transformation of switching regulated voltages using a inductor XFR6 supplying a plurality of indirectly regulated component output voltages summed to provide high output voltage, $V_{HI}$, as illustrated in FIG. 6. The cascading reduces both the voltage requirements on output filter capacitors and the reverse breakdown voltage requirements upon the current rectifiers. This type of arrangement is attractive in TV horizontal flyback high voltage generation, for example. Alternatively, the regulated component voltages can be used to provide a multiple-output voltage regulator with dc isolation between any pair of outputs as well as between each output and its input.

What I claim is:

1. A switching voltage regulator comprising:
   first and second terminals for connecting to a primary energy source;
   third and fourth terminals for connecting to a load;
   a converter transformer having first and second primary winding connections and having first and second secondary winding connections;
   electrically controllable first switch means for selectively connecting said first primary winding connection between said first and second terminals during first time intervals interspersed with second time intervals;
   first and second capacitors having interconnected first plates and having second plates respectively connected to said third terminal and to said fourth terminal;
   second switch means conductive during said first time intervals for connecting said first secondary winding connection across said first capacitor;
   third switch means conductive during said second time intervals for connecting said second secondary winding connection across said second capacitor;
   a third capacitor having a first plate connected to second terminal and having a second plate;
   fourth switch means conductive during said second time intervals for connecting said second primary winding connection across said third capacitor; and
   means responsive to the voltage between said first terminal and the second plate of said third capacitor departing from a prescribed value for developing electric control signal applied to said first switch means, thereby to complete a regulator loop for directly regulating the voltage between said first terminal and the second plate of said third capacitor and for indirectly regulating the voltage between said third and fourth terminals.

2. A switching voltage regulator as set forth in claim 1, wherein said first and second primary winding connections are each between the extremities of the same primary winding, and wherein said third and fourth secondary winding connections are each between the extremities of the same secondary winding.

3. A switching voltage regulator as set forth in claim 1 wherein one of said first and second primary winding connections is between the extremities of a primary winding and the other of these primary winding connections is between one of those extremities and a tap on the primary winding.

4. A switching voltage regulator as set forth in claim 1, wherein said first primary winding connection is between the extremities of a first primary winding of said converter transformer, and wherein said second primary winding connection is between the extremities of a second primary winding of said converter transformer.

5. A switching voltage regulator as set forth in claim 3 or 4 wherein one of said first and second secondary winding connections is between the extremities of a secondary winding and the other of these secondary winding connections is between one of those extremities and a tap on the secondary winding.

6. A switching voltage regulator as set forth in claim 3 or 4 wherein said first secondary winding connection is at the extremities of a first secondary winding of said converter transformer, and wherein said second secondary winding connection is at the extremities of a second secondary winding of said converter transformer.

7. A switching voltage regulator as set forth in claim 1 wherein said second, third, and fourth switch means are current rectifiers.

* * * * *